(12) United States Patent
Baek

(10) Patent No.: US 11,655,956 B2
(45) Date of Patent: May 23, 2023

(54) COMMUNICATION DEVICE AND METHOD FOR VEHICLE

(71) Applicant: HYUNDAI MOBIS CO., LTD., Seoul (KR)

(72) Inventor: Jong Hyun Baek, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 17/969,118

(22) Filed: Oct. 19, 2022

(65) Prior Publication Data

US 2023/0128040 A1 Apr. 27, 2023

(30) Foreign Application Priority Data

Oct. 26, 2021 (KR) .................. 10-2021-0143437
Oct. 26, 2021 (KR) .................. 10-2021-0143438

(51) Int. Cl.
*F21S 43/20* (2018.01)
(52) U.S. Cl.
CPC .................... *F21S 43/26* (2018.01)
(58) Field of Classification Search
CPC ...................................... F21S 43/26
See application file for complete search history.

(56) References Cited

U.S. PATENT DOCUMENTS

| | | | | |
|---|---|---|---|---|
| 10,661,706 B2* | 5/2020 | Kishigami | ............. | F21S 43/14 |
| 10,677,411 B2* | 6/2020 | Petit | .................. | F21S 43/27 |
| 10,899,273 B2* | 1/2021 | Nykerk | ................ | B60R 13/10 |
| 11,204,148 B2* | 12/2021 | Nykerk | ................ | F21S 41/153 |

FOREIGN PATENT DOCUMENTS

KR  10-2299337 B1  9/2021

* cited by examiner

*Primary Examiner* — Matthew J. Peerce
(74) *Attorney, Agent, or Firm* — NSIP Law

(57) ABSTRACT

Disclosed are a communication device and method for a vehicle, the device including a housing, an external lens structure covering an open front region of the housing, an internal lens structure mounted in the housing and covered by the external lens structure, a liquid crystal section mounted on the internal lens structure, configured to become transparent or opaque based on whether or not power is applied thereto, and a bezel disposed behind the liquid crystal section, such that the bezel becomes visible from an exterior of the communication device upon the liquid crystal section being controlled to be transparent.

13 Claims, 10 Drawing Sheets

COMMUNICATION DEVICE AND METHOD FOR VEHICLE

CROSS-REFERENCE TO RELATED APPLICATION

This application claims the benefit under 35 USC § 119(a) of priority Korean Patent Application Nos. 10-2021-0143438, filed on Oct. 26, 2021, and 10-2021-0143437, filed on Oct. 26, 2021, in the Korean Intellectual Property Office, the entire disclosures of which are incorporated herein by reference for all purposes.

BACKGROUND

1. Field

The present disclosure relates to a communication device and method for a vehicle, which provides information to another vehicle and a pedestrian even in autonomous driving.

2. Description of Related Art

In general, a driving vehicle may include a turn signal light and a brake light that can be used to provide information to observers of the vehicle. The turn signal light may be used to make a driver of another vehicle recognize when the vehicle changes its direction, and the brake light may be used to make a driver of a vehicle in the rear recognize whether the vehicle in front is braking.

Meanwhile, a driver of the vehicle may send a hand signal to a pedestrian or an occupant of a vehicle encountered in front to guide the pedestrian to safely walk or prevent a collision with the vehicle in front.

However, in the recent era of autonomous driving, the vehicle may drive itself by using artificial intelligence and various sensors even when the driver is not involved in driving the vehicle, where it may be impossible to provide information to the driver of another vehicle and the pedestrian.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a communication device for a vehicle includes a housing, an external lens structure covering an open front region of the housing, an internal lens portion mounted in the housing portion and covered by the external lens portion, a liquid crystal section mounted on the internal lens structure, configured to become transparent or opaque based on whether or not power is applied thereto, and a bezel disposed behind the liquid crystal section, such that the bezel becomes visible from an exterior of the communication device upon the liquid crystal section being controlled to be transparent.

The housing may be mounted on a front portion of a vehicle body.

The external lens structure may include multiple external exposure portions spaced apart from each other and exposed to the outside, an external recess, recessed to the rear, connecting the external exposure portions to each other, and an external cover mounted on the external exposure portions and covering the external recess.

The liquid crystal section may include one or more liquid crystal mounts mounted on the internal lens structure, a liquid crystal substrate connected to the liquid crystal mounts and configured to control the liquid crystal mounts, and at least one liquid crystal film connected to the liquid crystal mounts, attached to the internal lens structure, configured to become transparent or opaque based on whether or not power is applied to the liquid crystal film.

The at least one liquid crystal mount may include a plurality of liquid crystal mounts vertically spaced apart from each other with each liquid crystal mount having a length in a horizontal direction.

The at least one liquid crystal mount may include a plurality of liquid crystal mounts, each liquid crystal mount having a length in a vertical direction, and the multiple liquid crystal mounts may be horizontally spaced apart from each other.

The at least one liquid crystal film may include multiple liquid crystal films, and each of the liquid crystal films may be configured to be individually controlled to provide a communication signal.

The device may further include a light source mounted in the housing and radiating light to the internal lens structure.

The light source portion may include a light substrate mounted in the housing, and a light lamp positioned on the light substrate and radiating light to an end of the internal lens structure, and light radiated from the light lamp may move in the internal lens structure in a length direction of the internal lens structure.

The light source may include a light substrate mounted in the housing, a light lamp positioned at the light substrate and radiating light, and a light guide guiding light radiated from the light lamp in the length direction and reflecting light to the internal lens structure.

The light source portion may include a light support mounted in the housing and disposed at the rear of the internal lens structure, a light substrate mounted on the light support, a light lamp positioned on the light substrate and radiating light to the rear of the internal lens structure, and a light reflector mounted on the light support and reflecting light radiated from the light lamp toward the internal lens structure.

The light source portion may include a light support mounted in the housing and disposed on a side of the internal lens structure, a light substrate mounted on the light support, a light lamp positioned on the light substrate and radiating light to the rear of the internal lens structure, and a light reflector mounted on the light support and reflecting light radiated from the light lamp toward the internal lens structure.

In another embodiment, a communication method for a vehicle includes detecting a vehicle state, and providing information by using a difference in transparency between a non-powered region and a powered-on region when power is applied to a liquid crystal section selectively based on the vehicle state.

The method may further include radiating light, by a light source, to an internal lens structure as desired.

Other features and aspects will be apparent from the following detailed description, the drawings, and the claims.

Figure 1:
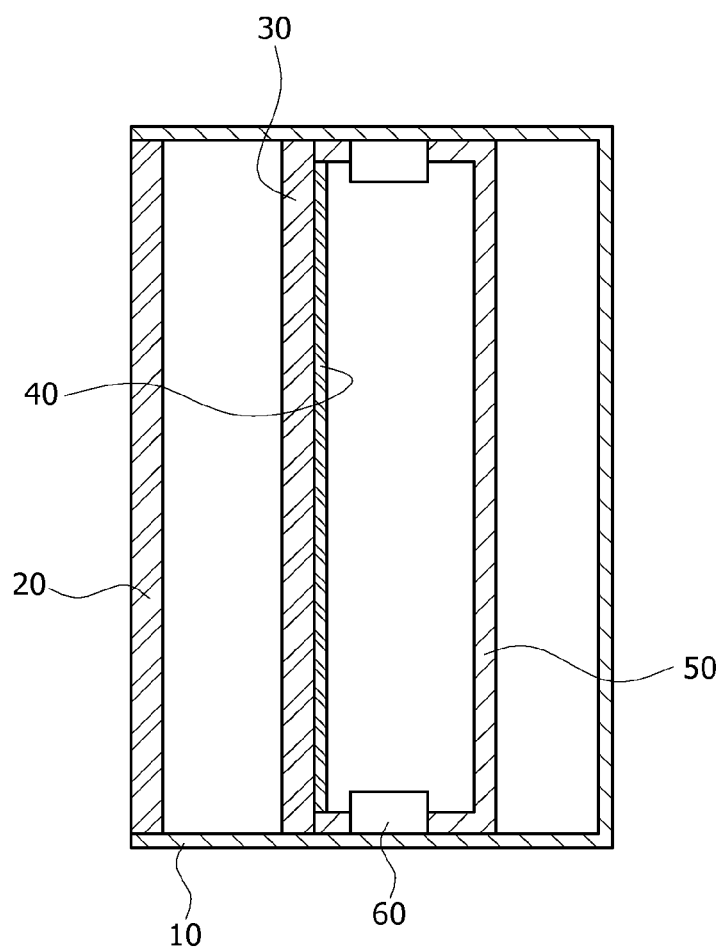
FIG. 1 is a view schematically showing a communication device for a vehicle according to an embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Various embodiments are directed to a communication device and method for a vehicle, which provide information to another vehicle and a pedestrian including in instances of autonomous driving.

FIG. 1 is a view schematically showing a communication device for a vehicle according to an embodiment of the present disclosure. Referring to FIG. 1, a communication device 1 for a vehicle according to an embodiment of the present disclosure may include a housing 10 (also referred to herein as a housing portion), an external lens structure 20 (also referred to herein as an external lens portion), an internal lens structure 30 (also referred to herein as an internal lens portion), a liquid crystal section 40 (also referred to herein as a liquid crystal portion), and a bezel 50 (also referred to herein as a bezel portion).

The housing portion 10 may be mounted on a vehicle body. For example, the housing portion 10 may be formed in a shape of a box having an open front. The housing portion 10 may have the external lens portion 20, the internal lens portion 30, the liquid crystal portion 40, and the bezel portion 50 disposed therein.

The external lens portion 20 may cover an open front region of the housing portion 10. For example, the external lens portion 20 may be exposed to the outside, and made of a transparent material that transmits light.

The internal lens portion 30 may be mounted in the housing portion 10 and covered by the external lens portion 20. For example, the internal lens portion 30 may have an edge fixed to the housing portion 10. The internal lens portion 30 may have a shape of an integrated plate or a plate divided into a plurality of pieces.

The liquid crystal portion 40 may be mounted on the internal lens portion 30 and become transparent or opaque based on whether or not power is applied thereto. In other words, the liquid crystal portion may become transparent while power is applied to it and may become opaque when power is not applied (or removed). For example, the liquid crystal portion 40 may use a polymer-dispersed liquid crystal in which a polymer and a liquid crystal are mixed with each other in a certain ratio, may be transparent to transmit light when power is applied thereto, and may be opaque to block light transmission when power is turned off. The liquid crystal portion 40 may be mounted on a rear surface of the internal lens portion 30.

The bezel portion 50 may be disposed at the rear of the liquid crystal portion 40, and may be visible from the outside when the liquid crystal portion 40 becomes transparent. For example, the bezel portion 50 may be manufactured in black, and the black color may thus be visible from the outside when the liquid crystal portion 40 becomes transparent. The bezel portion 50 may surround the liquid crystal portion 40 and may thus be visible from various angles.

Figure 2:
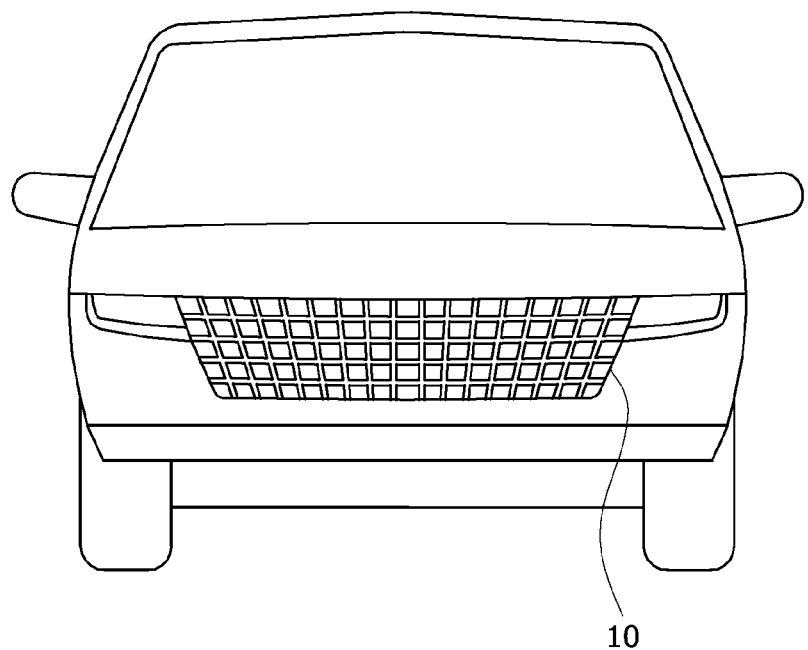
FIG. 2 is a view schematically showing a communication device for a vehicle disposed in the vehicle according to an embodiment of the present disclosure.

FIG. 2 is a view schematically showing that the communication device for a vehicle is disposed in the vehicle according to an embodiment of the present disclosure. Referring to FIG. 2, the housing portion 10 may be mounted on a front portion of the vehicle body. For example, the housing portion 10 may be disposed in a typical front grill region of the vehicle body, and front lamps may be disposed on both left and right sides thereof. The housing portion 10 may be modularized by building the communication device therein, and thus be replaced and used when a failure occurs or its pattern is changed.

Figure 3:
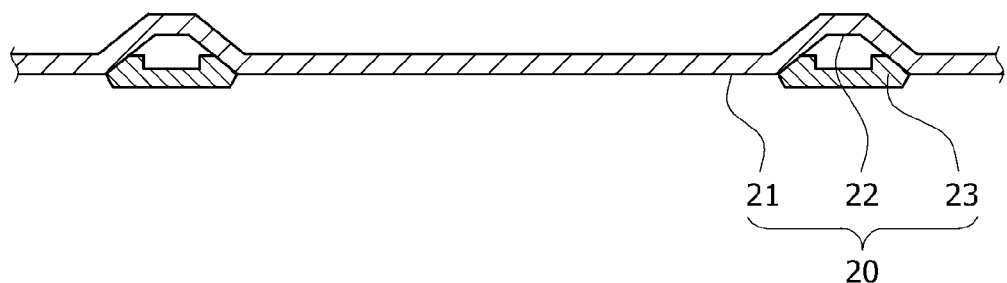
FIG. 3 is a view schematically showing an external lens portion according to an embodiment of the present disclosure.

FIG. 3 is a view schematically showing the external lens portion according to an embodiment of the present disclosure. Referring to FIG. 3, the external lens portion 20 according to an embodiment of the present disclosure may include an external exposure portion 21, an external recess portion 22 and an external cover portion 23.

The external exposure portion 21 may have a flat or curved plate shape to harmonize with a front portion of the vehicle. The external exposure portion 21 may cover a front portion of the housing portion 10.

The external recession portion 22 may connect the external exposure portions 21 and may be recessed to the rear. For example, the external recession portion 22 may be disposed between the external exposure portions 21 to support the internal lens portion 30 or the liquid crystal portion 40.

The external cover portion 23 may be mounted on the external exposure portion 21 and cover the external recession portion 22. For example, the external cover portion 23 may be made of a material that restricts the light transmission so that the external recession portion 22 and components disposed at the rear of the external recession portion 22 are not exposed to the outside.

Meanwhile, the external exposure portion 21 and the external recession portion 22 may be integrally molded, and the external cover portion 23 may be assembled to the external recession portion 22 as well as the external exposure portion 21.

Figure 4:
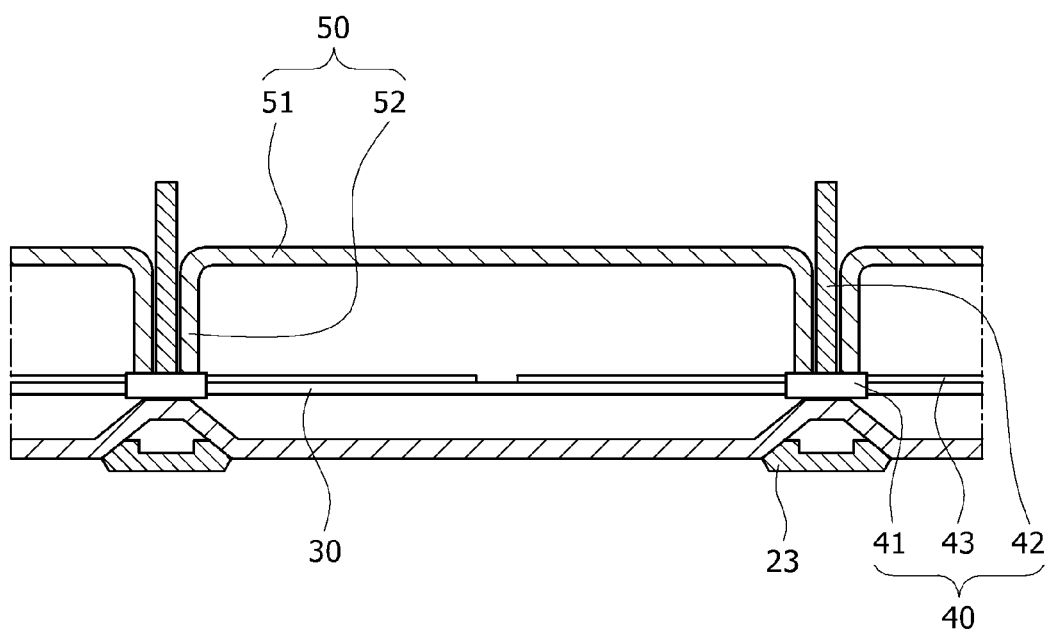
FIG. 4 is a view schematically showing a liquid crystal portion according to an embodiment of the present disclosure.

FIG. 4 is a view schematically showing the liquid crystal layer according to an embodiment of the present disclosure. Referring to FIG. 4, the liquid crystal portion 40 according to an embodiment of the present disclosure may include a liquid crystal power mount 41 (also referred to herein as a liquid crystal application portion), a liquid crystal substrate 42 (also referred to herein as a liquid crystal substrate portion), and a liquid crystal film 43 (also referred to herein as a liquid crystal film portion).

The liquid crystal application portion 41 may be mounted on the internal lens portion 30. For example, the liquid crystal application portion 41 may be mounted on the rear surface of the internal lens portion 30 or disposed between the internal lens portions 30. The external cover portion 23 may be disposed in front of the liquid crystal application portion 41. The liquid crystal application portion 41 may be supported by the external recession portion 22 when the internal lens portions 30 are coupled to both sides of the liquid crystal application portion 41. Meanwhile, the external cover portion 23 may be disposed between the external exposure portion 21 and the liquid crystal application portion 41 to cover the liquid crystal application portion 41 while supporting the internal lens portion 30 when the external recession portion 22 is removed and only the external exposure portion 21 is provided.

The liquid crystal substrate portion 42 may be connected to the liquid crystal application portion 41 and control the liquid crystal application portion 41. For example, the liquid crystal substrate portion 42 may be mounted on a rear surface of the liquid crystal application portion 41 and disposed at the rear of the liquid crystal application portion 41. The liquid crystal application portion 41 may apply power to the liquid crystal film portion 43 by the liquid crystal substrate portion 42.

The liquid crystal film portion 43 may be connected to the liquid crystal application portion 41 and attached to the internal lens portion 30. The liquid crystal film portion 43 may become transparent or opaque based on whether or not power is applied thereto. For example, the liquid crystal film portion 43 may be disposed on each of two sides of the liquid crystal application portion 41, and power may be applied by each liquid crystal application portion 41. The liquid crystal film portion 43 may use a polymer dispersed liquid crystal (PLDC).

Meanwhile, the bezel portion 50 may include a first bezel portion 51 disposed at the rear of the liquid crystal film portion 43 and a second bezel portion 52 extended forward from each of two ends of the first bezel portion 51 and connected to the liquid crystal application portion 41.

Figure 5:
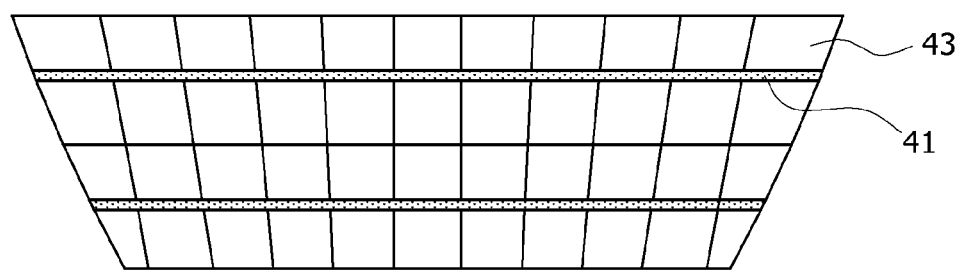
FIG. 5 is a view schematically showing that a liquid crystal application portion of FIG. 4 is disposed in a horizontal direction.

FIG. 5 is a view schematically showing that the liquid crystal application portion of FIG. 4 is disposed in a horizontal direction. Referring to FIG. 5, the liquid crystal application portion 41 may have a length in the horizontal direction, and the plurality of liquid crystal application portions 41 may be vertically spaced apart from each other. For example, the plurality of liquid crystal film portions 43 may be vertically connected to each other along the length of the liquid crystal application portion 41.

Figure 6:
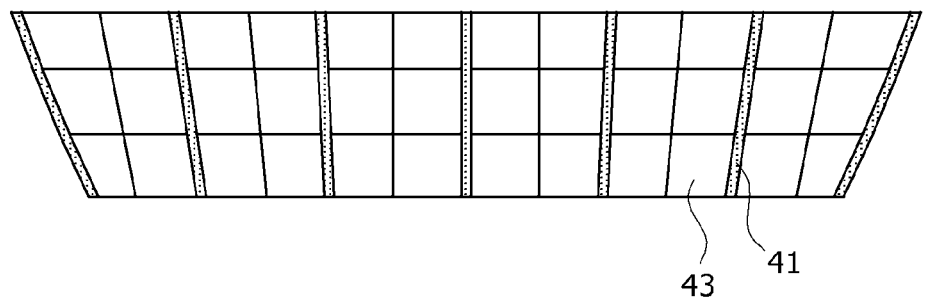
FIG. 6 is a view schematically showing that the liquid crystal application portion of FIG. 4 is disposed in a vertical direction.

FIG. 6 is a view schematically showing that the liquid crystal application portion of FIG. 4 is disposed in a vertical direction. Referring to FIG. 6, the liquid crystal application portion 41 may have a length in the vertical direction, and the plurality of liquid crystal application portions 41 may be horizontally spaced apart from each other. For example, the plurality of liquid crystal film portions 43 may be horizontally connected to each other along the length of the liquid crystal application portion 41.

Figure 7:
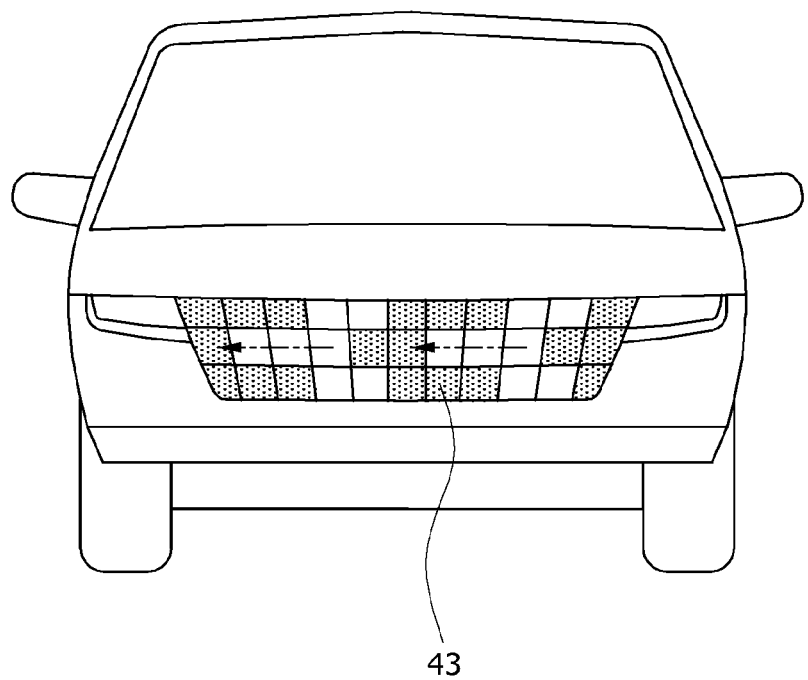
FIG. 7 is a view schematically showing that liquid crystal film portions are individually controlled to provide a communication signal according to an embodiment of the present disclosure.

FIG. 7 is a view schematically showing that the liquid crystal film portions are individually controlled to provide a communication signal according to an embodiment of the present disclosure. Referring to FIG. 7, the plurality of liquid crystal film portions 43 may be individually controlled to provide the communication signal. In more detail, the liquid crystal film portion 43 may communicate with a pedestrian or a driver of another vehicle by using a large-area phase shift of the vehicle. For example, the plurality of liquid crystal film portions 43 may be individually controlled to implement an animation expressing a welcome when a driver approaches the vehicle and an animation expressing a farewell when the driver gets off the vehicle and moves away. In addition, when an engine starts, the plurality of liquid crystal film portions 43 may implement an animation that gives an impression that the engine is on to notify a person around the vehicle of a movement of the vehicle. In addition, when the engine is turned off, all power applied to the liquid crystal film portion 43 may be turned off and the liquid crystal film portion 43 may thus be converted to be opaque, thereby giving an impression that the engine is off. In addition, when an unexpected situation occurs, the liquid crystal film portion 43 may implement an animation expressing a crisis situation of a vehicle state or driving environment, and an animation expressing a situation where a one-way arrow appears to be moved for the pedestrian to safely pass. Meanwhile, the liquid crystal film portion 43 may display a charging status of an electric vehicle, and a customized graphic may be provided by setting a specific image for an individual.

Referring back to FIG. 1, the communication device 1 for a vehicle according to an embodiment of the present disclosure may further include a light source 60 (also referred to herein as a light source portion).

The light source portion 60 may be mounted in the housing portion 10 and radiate light to the internal lens portion 30. For example, the light source portion 60 may induce the communication signal to be identified from the outside by radiating light to the internal lens portion 30 in a place where there is no external light. The light source portion 60 may be disposed between the internal lens portion 30 and the bezel portion 50, or may radiate light to the internal lens portion 30 from the outside of the bezel portion 50.

Meanwhile, when usage of the light source portion 60 is restricted in driving to comply with a traffic regulation, the light source portion 60 may be set to be turned on only in a state where the vehicle is stopped.

Figure 8:
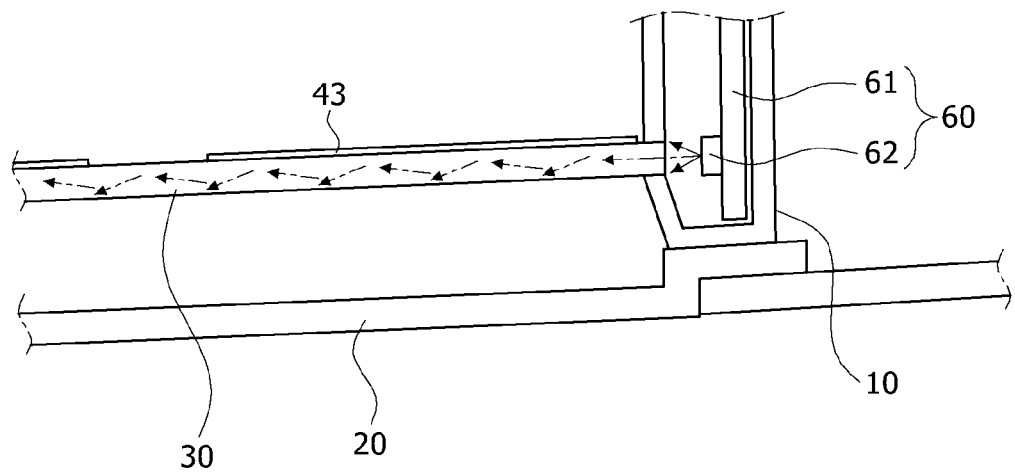
FIG. 8 is a view schematically showing a light source portion according to a first aspect of the present disclosure.

FIG. 8 is a view schematically showing the light source portion according to a first aspect of the present disclosure. Referring to FIG. 8, the light source portion 60 according to the first aspect of the present disclosure may include a first light substrate 61 and a first light lamp 62, respectively also referred to herein as first light substrate portion and first light lamp portion.

The first light substrate portion 61 may be mounted in the housing portion 10. For example, the first light substrate portion 61 may be disposed in one side or each of two sides of the housing portion 10. The first light substrate portion 61 may have a length corresponding to a width of the internal lens portion 30.

The first light lamp portion 62 may be positioned on the first light substrate portion 61 and radiate light to an end of the internal lens portion 30. For example, the plurality of first light lamp portions 62 may each be disposed in a column direction of the liquid crystal film portions 43 arranged to be spaced apart from each other.

Light radiated from the first light lamp portion 62 may move in the internal lens portion 30 in a length direction of the internal lens portion 30. For example, the internal lens portion 30 may transmit external light, and light introduced to the end of the internal lens portion 30 may be guided to move in the length direction. The internal lens portion 30 may be structurally partitioned in a row direction of the liquid crystal film portion 43 to individually guide light. In addition, the internal lens portion 30 may adopt any of various structures or shapes so that light introduced from each of the first light lamp portions 62 moves in the length direction without interference.

Figure 9:
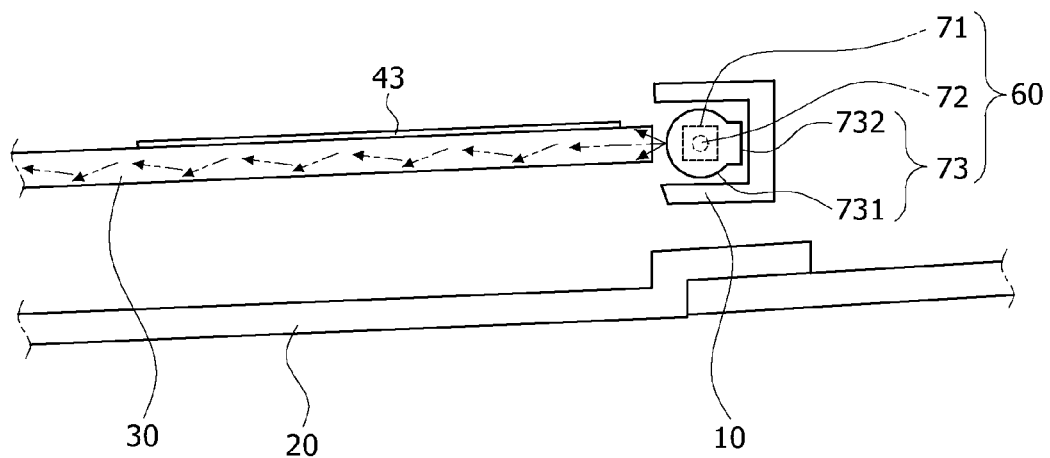
FIG. 9 is a view schematically showing a light source portion according to a second aspect of the present disclosure.

FIG. 9 is a view schematically showing a light source portion according to a second aspect of the present disclosure. Referring to FIG. 9, the light source portion 60 according to the second aspect of the present disclosure may include a second light substrate 71, a second light lamp 72 and a second light guide 73, respectively also referred to herein as a second light substrate portion, a second light lamp portion, and a second light guide portion.

The second light substrate portion 71 may be mounted in the housing portion 10. For example, the second light substrate portion 71 may be disposed in one side or each of two sides of the housing portion 10. The second light substrate portion 71 may be disposed perpendicular to the length direction of the internal lens portion 30.

The second light lamp portion 72 may be positioned at the second light substrate portion 71 and radiate light. For example, the second light lamp portion 72 may radiate light in a direction perpendicular to the length direction of the internal lens portion 30.

The second light guide portion 73 may guide light radiated from the second light lamp portion 72 in the length direction, and reflect light to the internal lens portion 30. For example, the second light guide portion 73 may include a second light guide tube 731 (also referred to herein as a second light guide tube portion) guiding light introduced in the length direction, and a second light guide reflector 732 (also referred to herein as a second light guide reflection portion) positioned at the second light guide tube portion 731 to reflect light to the internal lens portion 30. The second light guide reflection portions 732 may be uniformly arranged in a length direction of the second light guide tube portion 731, or may each be disposed in the column direction of the liquid crystal film portions 43 arranged to be spaced apart from each other.

Light radiated from the second light guide reflection portion 732 may be introduced to the end of the internal lens portion 30 and then move in the length direction of the internal lens portion 30. For example, the internal lens portion 30 may transmit external light, and light introduced to the end of the internal lens portion 30 may be guided to move in the length direction. The internal lens portion 30 may be structurally partitioned in the row direction of the liquid crystal film portion 43 to individually guide light. In addition, the internal lens portion 30 may adopt any of various structures or shapes so that light introduced from each of the light guide reflection portion 732 moves in the length direction without interference.

Figure 10:
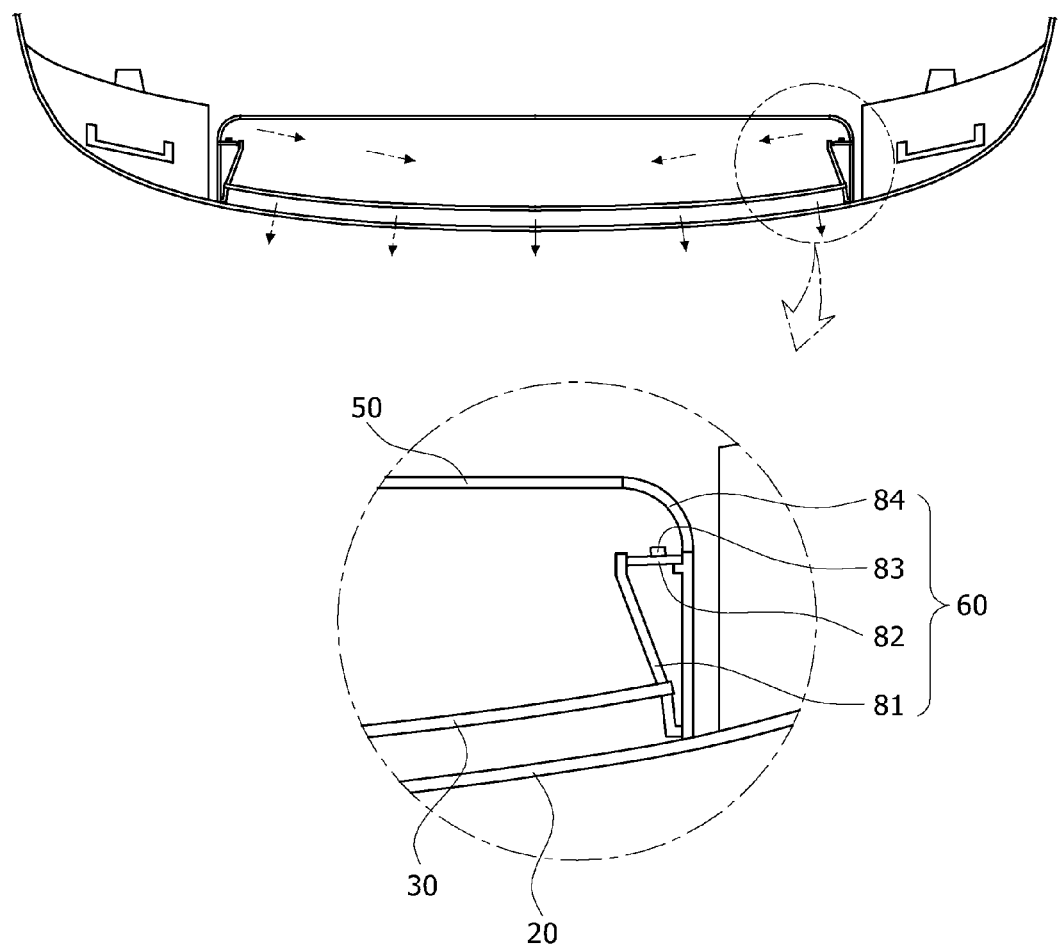
FIG. 10 is a view schematically showing a light source portion according to a third aspect of the present disclosure.

FIG. 10 is a view schematically showing a light source portion according to a third aspect of the present disclosure. Referring to FIG. 10, the light source portion 60 according to the third aspect of the present disclosure may include a third light support 81 (also referred to herein as a third light support portion), a third light substrate 82 (also referred to herein as a third light substrate portion), and a third light lamp 83 (also referred to herein as a third light lamp portion), and a third light reflector 84 (also referred to herein as a third light reflection portion).

The third light support portion 81 may be mounted in the housing portion 10 and disposed at the rear of the internal lens portion 30. For example, the third light support portion 81 may be disposed in each of two sides of the housing portion 10. The third light support portion 81 may be manufactured to include a material capable of transmitting light or the same black color as that of the bezel portion 50.

The third light substrate portion 82 may be mounted on the third light support portion 81. For example, the third light substrate portion 82 may be coupled to a rear end of the third light support portion 81 to maintain a fixed state.

The third light lamp portion 83 may be positioned on the third light substrate portion 82 and radiate light to the rear of the internal lens portion 30. For example, the third light substrate portion 82 may be disposed to have a length in a direction perpendicular to the internal lens portion 30, and at least one third light lamp portion 83 may be turned on by being mounted in a length direction of the third light substrate portion 82.

The third light reflection portion 84 may be mounted on the third light support portion 81, and reflect light radiated from the third light lamp portion 83 toward the internal lens portion 30. For example, the third light reflection portion 84 may have a curved shape, and light reflected from the third light reflection portion 84 disposed on each of two sides of the housing portion 10 may reach the end of the internal lens portion 30 disposed on an opposite side thereof to evenly reach the internal lens portion 30. The bezel portion 50 may be disposed between the pair of third light reflection portions 84.

Figure 11:
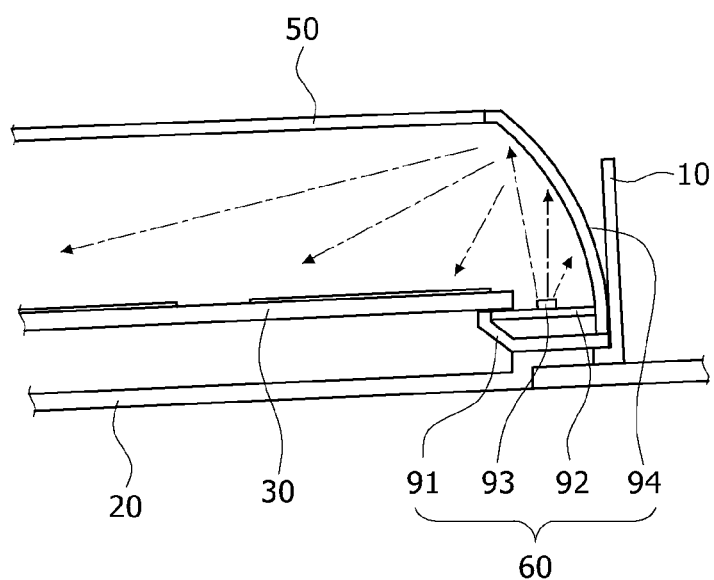
FIG. 11 is a view schematically showing a light source portion according to a fourth aspect of the present disclosure.

FIG. 11 is a view schematically showing a light source portion according to a fourth aspect of the present disclosure. Referring to FIG. 11, the light source portion 60 according to the fourth aspect of the present disclosure may include a fourth light support 91 (also referred to herein as a fourth light support portion), a fourth light substrate 92 (also referred to herein as a fourth light substrate portion), a fourth light lamp 93 (also referred to herein as a fourth light lamp portion), and a fourth light reflector 94 (also referred to herein as a fourth light reflection portion).

The fourth light support portion 91 may be mounted in the housing portion 10 and disposed on a side of the internal lens portion 30. For example, the fourth light support portion 91 may be disposed in one side or each of two sides of the housing portion 10. The fourth light support portion 91 may have one end supporting the end of the internal lens portion 30, and may be extended to a side of the internal lens portion 30 to be supported by the external lens portion 20.

The fourth light substrate portion 92 may be mounted on the fourth light support portion 91. For example, the fourth light substrate portion 92 may be coupled to the fourth light support portion 91 to maintain its disposition on the side of the internal lens portion 30.

The fourth light lamp portion 93 may be positioned on the fourth light substrate portion 92 and radiate light to the rear of the internal lens portion 30. For example, the fourth light substrate portion 92 may be disposed to have a length in the direction perpendicular to the internal lens portion 30, and at least one fourth light lamp portion 93 may be turned on by being mounted in a length direction of the fourth light substrate portion 92.

The fourth light reflection portion 94 may reflect light radiated from the fourth light lamp portion 93 toward the internal lens portion 30. For example, the fourth light reflection portion 94 may have a curved shape, and may guide light to uniformly reach from one end of the internal lens portion 30 to the other end thereof. The bezel portion 50 may be connected to the fourth light reflection portion 94.

Figure 12:
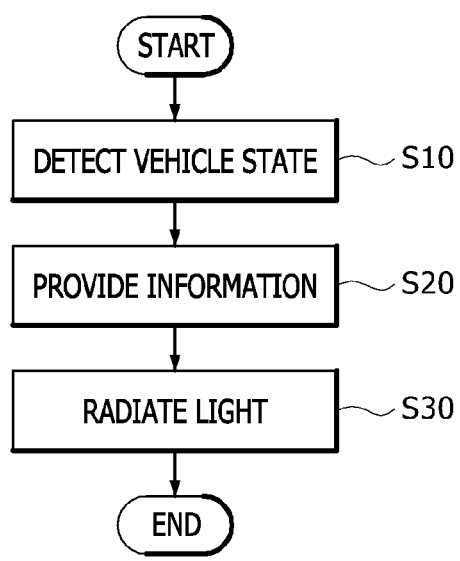
FIG. 12 is a flowchart schematically showing a communication method for a vehicle according to another embodiment of the present disclosure.

FIG. 12 is a flowchart schematically showing a communication method for a vehicle according to another embodiment of the present disclosure. The following description describes the communication method for a vehicle according to another embodiment of the present disclosure with reference to FIG. 12.

First, a controller may detect a vehicle state (S10). That is, the controller may detect on/off of an engine or detect the proximity or distance of a driver through a detection sensor, and detect a position of a pedestrian.

The controller may apply power to the liquid crystal portion 40 selectively based on the vehicle state when detecting the vehicle state. As a result, the controller may provide information to a driver of another vehicle and the pedestrian passing by using a difference in transparency between a non-powered region and a powered-on region (S20).

Meanwhile, the light source portion 60 may radiate light to the internal lens portion 30 as desired (S30). Light generated by the light source portion 60 may evenly reach the internal lens portion 30 to improve identification from the outside in a place where there is no external light source or in a dark place. Here, the light source portion 60 may be turned on while the vehicle is stopped in order to comply with a vehicle regulation.

The following description describes the communication device for a vehicle having the above structure according to an embodiment of the present disclosure and the method for the same.

First, the housing portion 10 may be modularized by building the internal lens portion 30, the liquid crystal portion 40 mounted on the internal lens portion 30, and the bezel portion 50 mounted on the liquid crystal portion 40 therein, and mounting the external lens portion 20 on the front portion of the housing portion 10. The modularized communication device 1 for a vehicle may be assembled to the front portion of the vehicle.

In the above state, the controller may individually turn on/off power applied to the liquid crystal portion 40 by using various detection sensors based on a surrounding condition and a driving condition. Accordingly, the difference in the transparency of the plurality of liquid crystal film portions 43 may be generated to provide various communication images.

That is, when power applied to the liquid crystal film portion 43 is turned off, an external light source such as natural light or street lamp light may be reflected from the liquid crystal film portion 43 to be visible as grayish white. In addition, when power applied to the liquid crystal film portion 43 is turned on, the black color may be visible due to the black bezel portion 50 disposed at the rear of the transparent liquid crystal film portion 43. Meanwhile, the light source portion 60 may be turned on as desired to improve the identification from the outside.

In the communication device and method for a vehicle according to the embodiments of the present disclosure, the internal lens portion 30 may be mounted in the housing portion 10, the liquid crystal portion 40 mounted on the internal lens portion 30 may provide communication information to the driver of another vehicle or the pedestrian by varying its transparency based on whether or not power is applied thereto, and the light source portion 60 may be turned on as desired to improve the communication identification from the outside.

As set forth above, in the communication device and method for a vehicle according to the embodiments of the present disclosure, the internal lens portion may be mounted in the housing portion, the liquid crystal portion mounted on the internal lens portion may provide the communication information to the driver of another vehicle or the pedestrian by varying its transparency based on whether or not power is applied thereto, and the light source portion may be turned on as desired (for example, based on a predetermined input or a driver input) to improve the communication identification from the outside.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A communication device for a vehicle, the communication device comprising:
    a housing;
    an external lens structure covering an open front region of the housing, wherein the external lens structure includes:
        a plurality of external exposure portions spaced apart from each other and exposed to the outside;
        an external recess, recessed to the rear, connecting the external exposure portions to each other; and
        an external cover mounted on the external exposure portions and covering the external recess;
    an internal lens structure mounted in the housing and covered by the external lens structure;
    a liquid crystal section mounted on the internal lens structure, configured to become transparent or opaque based on whether or not power is applied thereto, wherein the liquid crystal section includes a plurality of liquid crystal films; and
    a bezel disposed behind the liquid crystal section, such that the bezel becomes visible from an exterior of the communication device upon the liquid crystal section being controlled to be transparent.

2. The communication device of claim 1, wherein the housing is mounted on a front portion of a vehicle body.

3. The communication device of claim 1, wherein the liquid crystal section includes: at least one liquid crystal power mount mounted on the internal lens structure; a liquid crystal substrate connected to the at least one liquid crystal power mount and configured to control the at least one liquid crystal power mount, and at least one liquid crystal film connected to the at least one liquid crystal power mount, attached to the internal lens structure, configured to become transparent or opaque based on whether or not power is applied thereto.

4. The communication device of claim 3, wherein the at least one liquid crystal mount includes a plurality of liquid crystal power mounts vertically spaced apart from each other, and each liquid crystal mount has a length in a horizontal direction.

5. The communication device of claim 3, wherein: the at least one liquid crystal mount includes a plurality of liquid crystal mounts; each liquid crystal power mount has a length in a vertical direction; and the plurality of liquid crystal mounts are horizontally spaced apart from each other.

6. The communication device of claim 3, wherein the at least one liquid crystal film includes a plurality of liquid crystal films, and each of the plurality of liquid crystal films is configured to be individually controlled to provide a communication signal.

7. The communication device of claim 1, further comprising a light source mounted in the housing and configured to radiate light to the internal lens structure.

8. The communication device of claim 7, wherein the light source includes a light substrate mounted in the housing, and a light lamp positioned on the light substrate and configured to radiate light to an end of the internal lens structure; and light radiated from the light lamp moves in the internal lens structure in a length direction of the internal lens structure.

9. The communication device of claim 7, wherein the light source includes: a light substrate mounted in the housing; a light lamp positioned at the light substrate and configured to radiate light; and a light guide configured to guide light radiated from the light lamp in the length direction and reflect light to the internal lens structure.

10. The communication device of claim 7, wherein the light source includes: a light support mounted in the housing and disposed at the rear of the internal lens structure; a light substrate mounted on the light support; a light lamp positioned on the light substrate and configured to radiate light to the rear of the internal lens structure; and a light reflector mounted on the light support and configured to reflect light radiated from the light lamp toward the internal lens structure.

11. The communication device of claim 7, wherein the light source includes: a light support mounted in the housing and disposed on a side of the internal lens structure; a light substrate mounted on the light support; a light lamp positioned on the light substrate and configured to radiate light to the rear of the internal lens structure; and a light reflector mounted on the light support and configured to reflect light radiated from the light lamp toward the internal lens structure.

12. A communication method for using the structure of claim 1 in a vehicle, the method comprising: detecting a vehicle state; and providing information by using a difference in transparency between a non-powered region and a powered-on region when power is applied to a liquid crystal section selectively based on the vehicle state.

13. The communication method of claim 12, further comprising radiating light of radiating the light, by a light source, to an internal lens structure as desired.

\* \* \* \* \*